Feb. 5, 1957 J. C. EWART ET AL 2,780,271
APPARATUS FOR MECHANICALLY EXPANDING LARGE DIAMETER PIPE
Filed Sept. 27, 1951 5 Sheets-Sheet 2
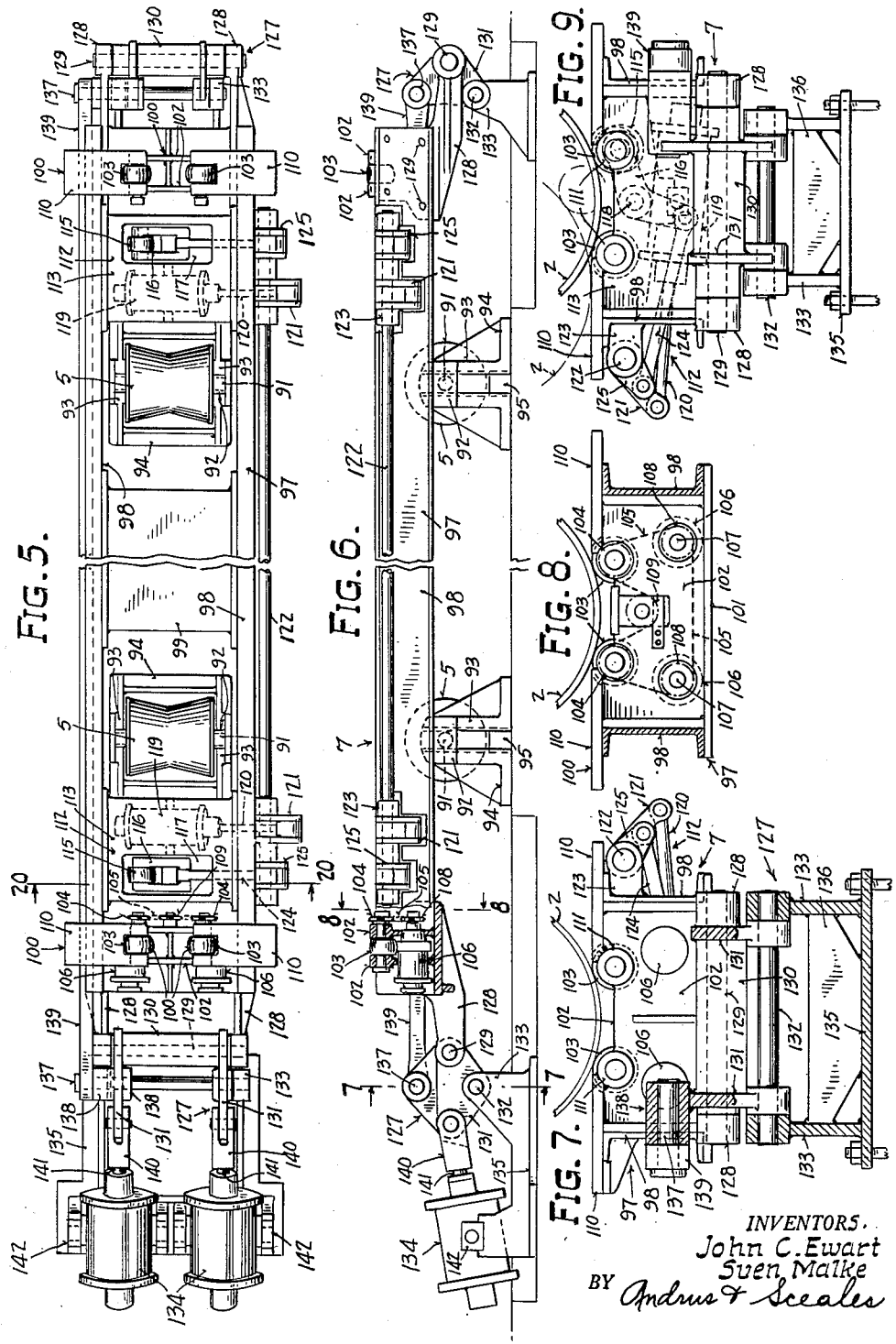
INVENTORS.
John C. Ewart
Sven Malke
BY Andrus & Sceales
ATTORNEYS.

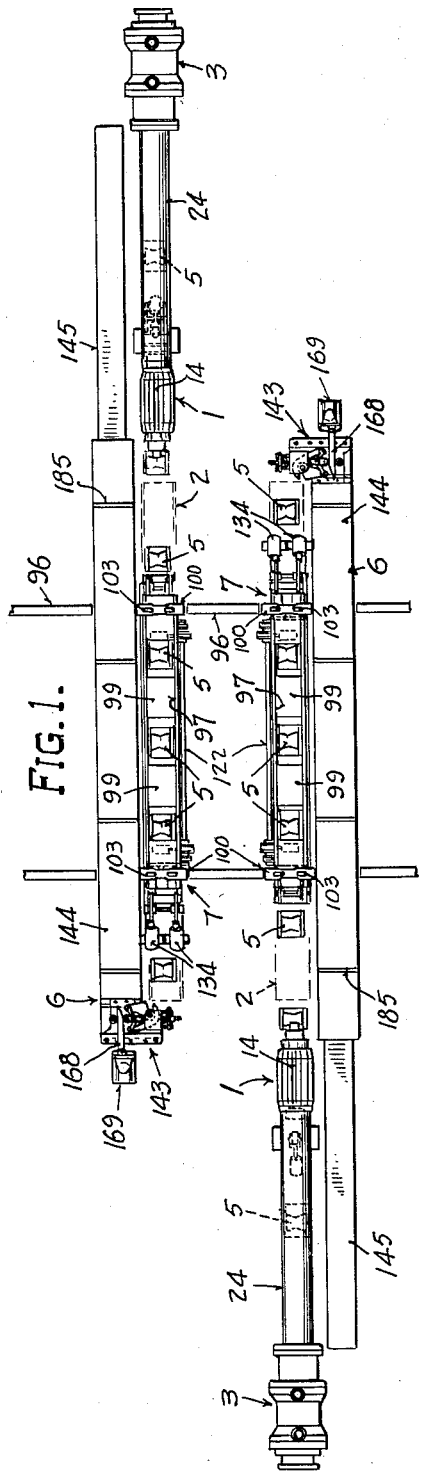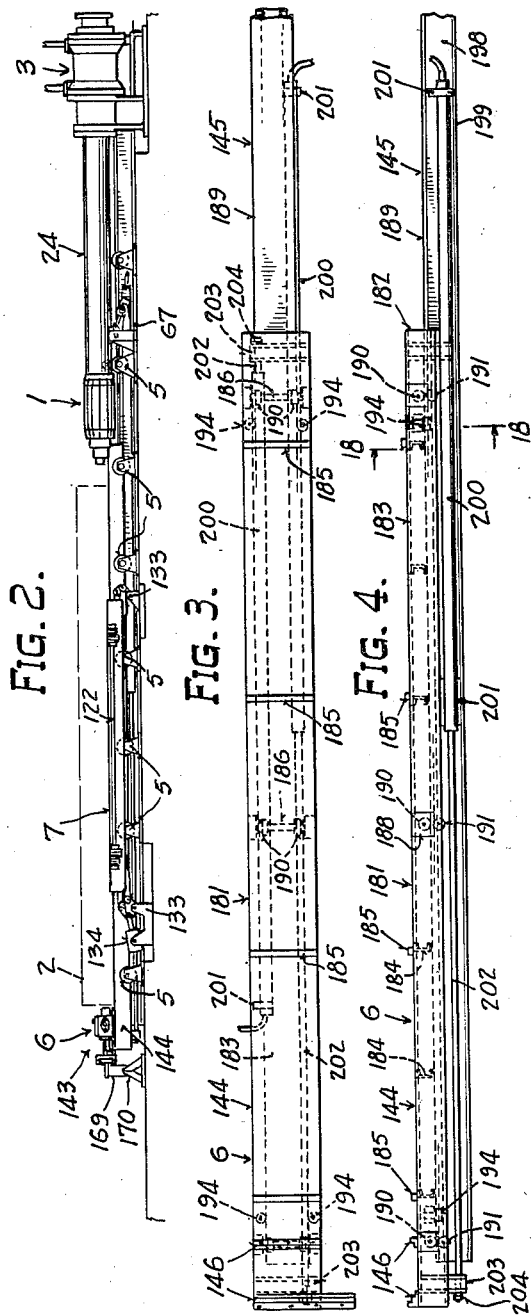

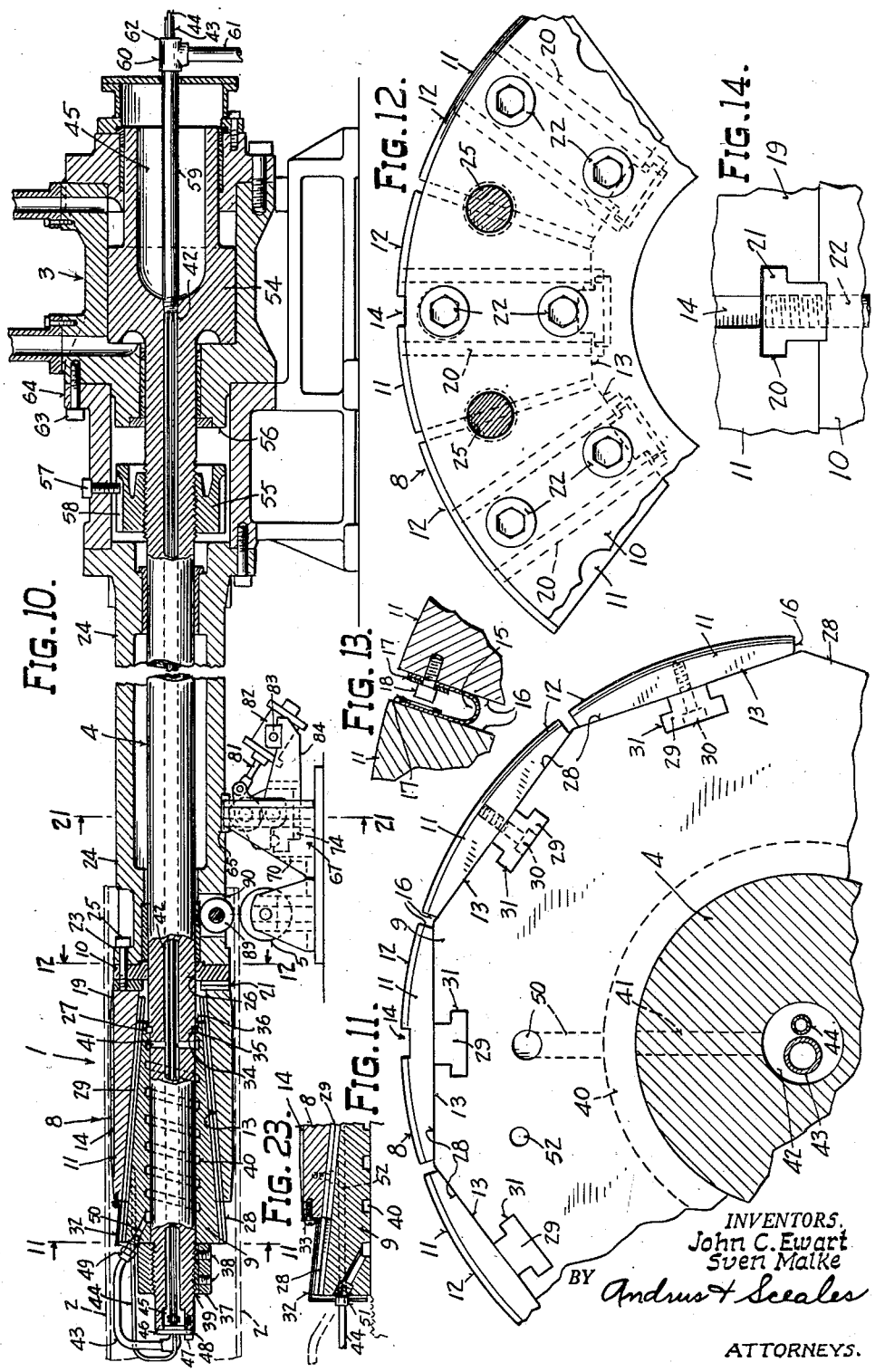

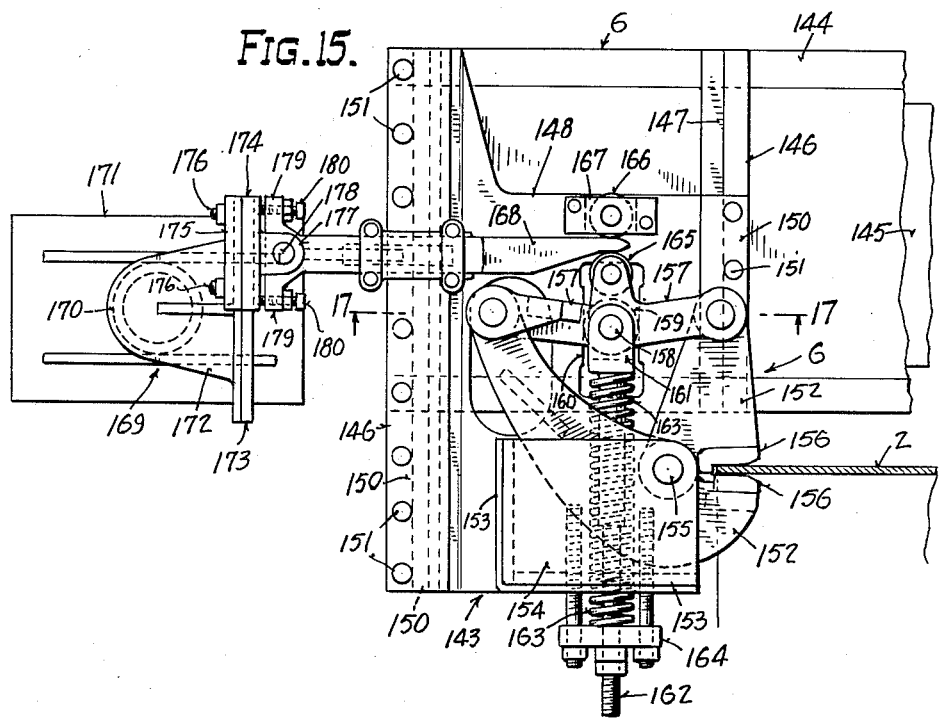

Feb. 5, 1957     J. C. EWART ET AL     2,780,271
APPARATUS FOR MECHANICALLY EXPANDING LARGE DIAMETER PIPE
Filed Sept. 27, 1951     5 Sheets-Sheet 5
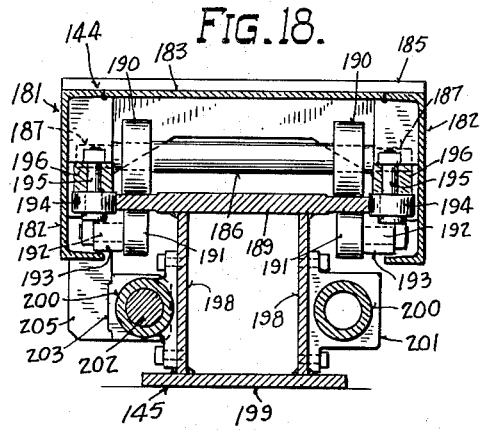
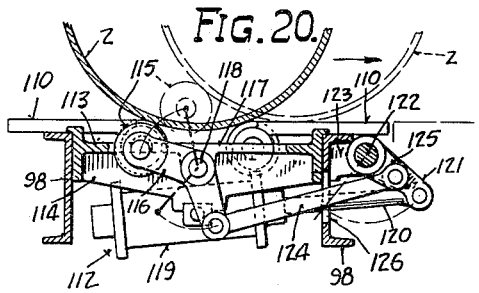
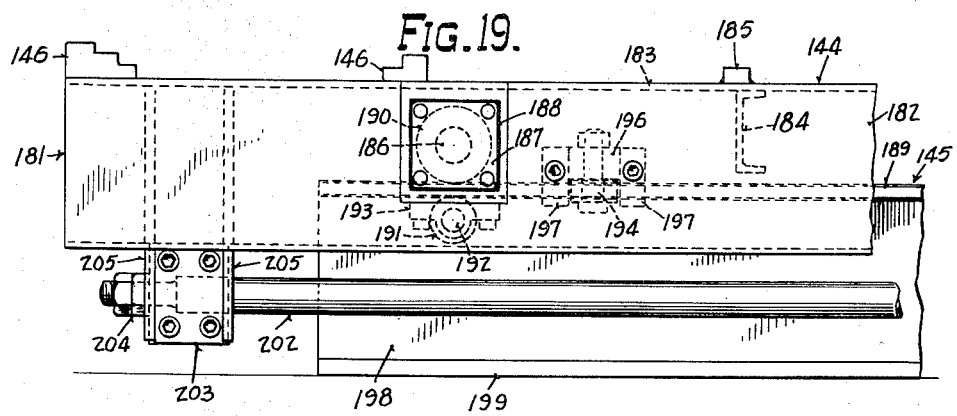
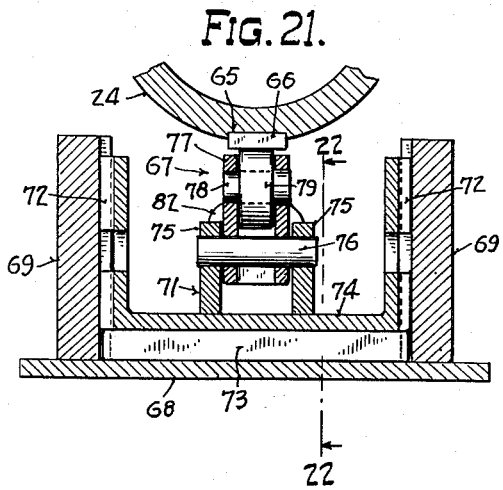
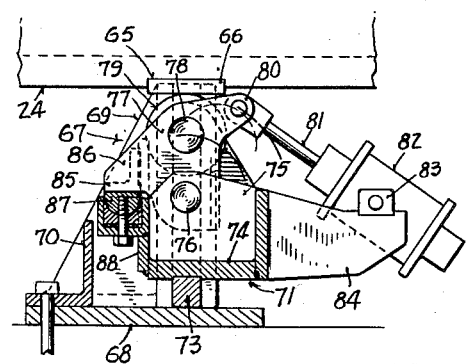
INVENTORS.
John C. Ewart
Sven Malke
BY Andrus & Sceales
ATTORNEYS.

United States Patent Office 2,780,271
Patented Feb. 5, 1957

2,780,271

APPARATUS FOR MECHANICALLY EXPANDING LARGE DIAMETER PIPE

John C. Ewart and Sven Malke, Milwaukee, Wis., assignors to A. O. Smith Corporation, Milwaukee, Wis., a corporation of New York Application September 27, 1951, Serial No. 248,512

13 Claims. (Cl. 153—80.5)

This invention relates to pipe expanders and more particularly to a pipe expander for expanding long sections of relatively large diameter pipe and to a method for employing the same.

At the present time, most of the large diameter pipe to be employed for transporting oil or gas is constructed by rolling sheet metal into the proper tubular form and welding the adjacent edges together along a longitudinal seam.

The sheet metal thus utilized must necessarily be of a ductile nature, for a hard, high-strength sheet could not be suitably rolled into a tubular form. To increase the strength of the fabricated pipe, some method of working is necessary. This may be accomplished by expanding the low strength pipe in cross section, thus increasing the strength and other mechanical properties by cold working.

Heretofore, large diameter pipe was expanded by closing off or plugging the ends thereof and injecting a hydraulic fluid within the closed-off pipe. The fluid, being under extreme pressure, expanded the pipe radially outward against a number of die segments which surrounded the pipe and which determined the ultimate cross-sectional size of the pipe. This method of expansion required expensive and unwieldly equipment. The die segments, having a length of perhaps thirty feet, were extremely costly, and large powerful installations were necessary to move the segments in order to insert the pipe therebetween prior to expansion and remove the expanded pipe after expansion.

As the hydraulic fluid was under great pressure, worn gaskets, worn pipe plugs and fluid leaks were frequently encountered and the maintenance cost of operating this unit were considerable. In addition, separate expanding operations, which require transfer of the pipe to other machines, were required to be performed on the unexpanded ends of the pipe, as the ends were secured against expansion to prevent leakage of the fluid during the original expansion operation.

The present invention provides an expanding device for expanding long sections of large diameter pipe whereby the pipe is expanded to a predetermined cross section through its entire length by a series of internal expansion operations. As the dies are employed within the pipe, the inside diameter of the expanded pipe is the accurate dimension or limiting factor rather than the outer diameter if an encircling die is employed, and, as such, the welding of sections of expanded pipe together is greatly facilitated by use of this invention.

The pipe expanding device of the present invention is extremely simple in structure and inexpensive in original cost and maintenance. This saving in cost is due in part to the fact that the die segments of the present invention, having a length of about three feet as compared to thirty feet for the hydraulic unit, are relatively inexpensive.

Furthermore, the present invention provides an expanding device which may be set up or assembled in about one-tenth of the time required for that of the hydraulic unit, and it necessitates no highly reinforced foundation which is necessary for the extremely heavy hydraulic unit.

Another object of the invention is to provide a new and expedient method of feeding and conveying long sections of relatively large diameter pipe to a stationary expander.

Another object is to provide a novel means of removing the heat generated by the expansion operation from the expander means whereby a cooling fluid is introduced and discharged through the piston rod which actuates the expander means.

Another object is to provide an expandable die assembly in which the dies are held in proper alignment during expansion by both longitudinal and radial keys.

The present invention is directed to a device for expanding long sections of relatively large diameter pipe to a specific diameter to obtain certain predetermined physical properties in the pipe, particularly hardness and tensile strength. By this invention, a low strength pipe, having a diameter slightly smaller than the ultimately desired diameter, is expanded to the desired diameter with a resulting predetermined increase in the hardness and strength of the pipe by a series of internal expansion operations.

The pipe expanding device of the present invention comprises a pair of expander units disposed in parallel relation to each other, each of which, in turn, is adapted to circumjacently receive and expand the opposite ends of the pipe. Each expander unit consists of an annular die assembly, formed of a plurality of circumferentially disposed dies around which the pipe to be expanded is disposed, and a tapered mandrel which is adapted to be drawn into the die assembly by a hydraulic cylinder and expand the dies outwardly against the pipe.

For each expander unit, a lifter unit is employed which receives the pipe from a storage rack and is adapted to lower the same onto a series of conveyor rollers aligned with the expander unit. The pipe is moved over the conveyor rollers, a substantial distance onto the expander unit into position for expansion, by a feeder unit.

The portion of the pipe encircling the die assembly is expanded outwardly by drawing the mandrel into the die assembly, and after the expansion, the mandrel is retracted from the die assembly thereby collapsing the dies. The pipe is moved further onto the expander unit by the feeder unit, and a second segment of pipe is similarly expanded. After a series of such operations covering slightly more than one-half of the length of the pipe, the pipe is withdrawn from the expander unit on the conveyor rollers by the feeder unit.

The lifter unit raises the pipe from the conveyor rollers and ejects it onto a second storage rack. A similar expanding process is repeated on the opposite, unexpanded, end of the pipe by the second expander unit to produce a fully expanded pipe section.

Other objects and advantages will appear from the accompanying description of an embodiment of the invention.

In the drawings:

Figure 1 is a top plan view of the pipe expanding assembly;

Fig. 2 is a side elevation of one of the expanding units;

Fig. 3 is an enlarged top plan view of the feeder mechanism;

Fig. 4 is an enlarged side elevation of the feeder mechanism;

Fig. 5 is an enlarged top plan view of the lifter unit;

Fig. 6 is an enlarged side elevation of the lifter unit;

Fig. 7 is a transverse section on line 7—7 of Fig. 6 showing the linkage units;

Fig. 8 is a transverse section on line 8—8 of Fig. 6 showing the transverse roller units;

Fig. 9 is a forward end elevation of the lifter unit;

Fig. 10 is a longitudinal section of an expander unit and hydraulic cylinder with a part being broken away.

Fig. 11 is a fragmentary transverse section on line 11—11 of Fig. 10 showing the die assembly and mandrel;

Fig. 12 is a fragmentary transverse view taken on line 12—12 of Fig. 10 showing the attachment of the radial keys to the thrust plate;

Fig. 13 is a fragmentary section showing the attachment of canvas shields between adjacent dies;

Fig. 14 is a fragmentary top plan view of the forward end of the die assembly showing the radial keys;

Fig. 15 is a top plan view of the clamping jaw mechanism;

Fig. 16 is a side elevation of the clamping jaw mechanism;

Fig. 17 is a section on line 17—17 of Fig. 15;

Fig. 18 is a transverse section on line 18—18 of Fig. 4 showing the carriage and rail unit;

Fig. 19 is a fragmentary side elevation of the feeder mechanism showing the attachment of the piston rod to the carriage;

Fig. 20 is a transverse section on line 20—20 of Fig. 5 showing a transfer unit;

Fig. 21 is a transverse section on line 21—21 of Fig. 10 showing the housing support;

Fig. 22 is a section on line 22—22 of Fig. 21; and

Fig. 23 is an enlarged fragmentary view of Fig. 10 showing the attachment of the shield to the rearward end of the die assembly.

Referring to the drawings, there is illustrated in Figure 1 an assembly for expanding long sections of relatively large diameter metal pipe comprising a pair of expander units 1 disposed in parallel relation, each of which is employed to successively act on opposite ends of the pipe 2 to be expanded.

For each expander unit, the assembly in general comprises a hydraulic cylinder 3, or a similar reciprocating means, which is connected to the expander unit by a piston rod 4 and serves to actuate said units 1, a series of conveyor rollers 5 disposed in series with the expander unit 1 and employed to convey the pipe to and from said units, a feeder unit 6 disposed adjacent to the conveyor rollers and utilized to grasp and move the pipe over the rollers, and a lifter unit 7 which receives the pipe from a suitable storage rack, not shown, and is employed to lower the same onto said conveyor rollers 5 before the expansion operation and to raise and eject the pipe from the rollers after expansion.

Expander unit 1 as best shown in Figs. 10, 11 and 12 comprises a hollow expandable die assembly 8, into the rearward end of which a tapered mandrel 9 is adapted to be drawn by piston rod 4 to expand the die assembly outwardly against the pipe 2. A fixed thrust plate 10 is secured to the forward end of the die assembly 8 and serves to align and brace the assembly during the expansion operation.

The die assembly 8 consists of a plurality of circumferentially disposed dies 11, each die being generally wedge-shaped and formed with a generally curved outer surface 12, which is adapted to be in contacting relation with the inner surface of the pipe to be expanded, and a flat inner surface 13 against which a corresponding surface of the polygon-shaped mandrel 9 is adapted to slide as the mandrel is drawn into the die assembly.

A portion of the curved outer surface 12 of each die 11 adjacent the rearward end of the die assembly is provided with a slight inward taper. The portion of the pipe 2 encircling this tapered portion of the dies 11 is partially expanded during the expansion operation to provide a tapered connection between the fully expanded and unexpanded portions of the pipe. As the pipe 2 is moved forward on the expander unit 1, the partially expanded portion of the pipe is disposed circumjacent to the forward portion of the die assembly 8 to provide an area of overlap and is fully expanded in the next expansion increment. This results in a smoothly expanded pipe section without ridges or humps at the area of overlap.

The outer surface 12 of the uppermost die in the assembly may be formed with a longitudinal slot 14, as shown in Fig. 11, which extends the length of the die. Slot 14 is adapted to receive the longitudinal seam weld of the pipe 2.

A plurality of canvas shields 15, as illustrated in Fig. 13, are disposed between the radially tapered side surfaces 16 of the adjacent dies in the upper half of the die assembly to keep dust and foreign material from the die surfaces 16. Each shield 15 extends the length of dies 11 and is attached between the adjacent side surfaces 16 of the dies by a retaining strip 17 and set screws 18.

When the die assembly is in its collapsed position and side surfaces 16 of the adjacent dies are in proximate relation, the screws 18 in each side surface 16 of the respective dies extend through a suitable opening in retaining strip 17 attached to the adjacent die and are received by a recess in the side surface of the adjacent die.

The canvas shield 15 sags radially inwardly from its attached position between adjacent dies 11, and the amount of sag or play is determined by the magnitude of separation of the adjacent dies during expansion. That is, there should be a sufficient sag to permit the shield to extend across the enlarged separation between the side surfaces 16 of the dies when the die assembly 8 is in an expanded position, without stretching of the fabric shield.

The forward end 19 of each die 11 is in contacting relation with annular thrust plate 10 and is formed with a radial keyway 20, Fig. 14, which is adapted to slidably cooperate with one of a series of radially disposed thrust plate keys 21 which are secured to thrust plate 10 by bolts 22.

By virtue of the keys 21, dies 11 are radially aligned with the permanently positioned thrust plate 10, and, while the dies are permitted to move radially outward during the expansion, rotary motion of the dies is prevented. In addition, the radial keys prevent longitudinal movement of the dies when mandrel 9 is retracted from the die assembly.

To secure thrust plate 10 against movement during the expansion operation, the forward surface thereof is attached to the annular flange 23 of piston rod housing 24 by a plurality of circumferentially spaced bolts 25.

The annular thrust plate 10 has an outer diameter approximating that of the contracted die assembly 8 and is formed with an axial opening 26 to receive the piston rod 4. There is a sufficient clearance between rod 4 and the annular surfaces bounding opening 26 to permit thrust plate 10 to be withdrawn from piston rod 4 over the annular split ring 27.

The tapered mandrel or expander 9 is adapted to be received by the rearward end of die assembly 8 with dies 11 being expanded outwardly against the pipe 2 as the mandrel is drawn into the assembly.

Mandrel 9 has a tubular structure with a polygonal outer surface consisting of a plurality of flat surfaces 28. Surfaces 28 taper toward the forward end of the mandrel, which is received by the rearward end of die assembly 8, and are adapted to complement the flat inner surfaces 13 of the dies 11.

To maintain the dies in proper alignment and to guide the expander in reciprocating movement within the die assembly, mandrel 9 is longitudinally keyed to die assembly 8. A plurality of keys 29, Fig. 11, are attached by radial spaced bolts 30 to inner surfaces of dies 11 and cooperate with keyways 31 which are formed in the complementary mandrel surfaces 28.

The surfaces of both the radial keys 20 and longitudinal keys 29 may be formed with a plurality of recesses or grooves which serve to retain a lubricating medium which may be introduced within the keyed surfaces, thereby reducing the sliding friction therebetween and the resulting heat generation during expansion.

A flexible shield 32 is attached to the rearward end of each of the dies 11 in the upper half of die assembly 8 by suitable screws 33, see Fig. 23. Shield 32 is of a sufficient width to extend outwardly to cover surfaces 28 of mandrel 9 which project beyond the rearward end of die assembly 8 when the mandrel is withdrawn from the assembly. Shield 32 prevents dirt and foreign matter from accumulating on the projecting surfaces 28.

The mandrel 9 is axially mounted on the piston rod 4 and forwardly positioned thereon by split ring 27 which is partially set in annular groove 34 in rod 4. The outer portion of ring 27 bears against shoulder 35 in annular recess 36 formed in the tapered forward end of mandrel 9. The split ring 27 prevents forward movement of mandrel 9 on piston rod 4 and serves as a thrust ring to transmit the backward thrust of the piston rod to the mandrel on withdrawal of the mandrel from the die assembly.

Mandrel 9 is rearwardly positioned on piston rod 4 by the nut 37 which is threaded onto piston rod 4 and bears against the rearward end of mandrel 9. Nut 37 not only positions the mandrel on the piston rod but serves as a shoulder for the mandrel when it is drawn into the die assembly. The mandrel is thus firmly positioned on rod 4 between split ring 27 and nut 37 to prevent axial movement of the mandrel on the rod.

The nut 37 is maintained in contacting relation with mandrel 9 by a suitable locking means. This may take the form of a plurality of set screws 38 which extend through nut 37 and bear on a threaded nut lock insert 39 as indicated in Fig. 10.

To cool the expander unit during operation, mandrel 9 is formed with a generally spiral groove 40 in the inner annular surface thereof adjacent piston rod 4 which is adapted to receive a cooling fluid.

Groove 40 extends substantially the length of mandrel 9 with the last semi-revolution of the groove adjacent the forward end of the mandrel communicating with the diametrically opposite extremities of a radial aperture 41 in piston rod 4. Aperture 41 intersects an axial passage 42 formed in piston rod 4.

A pair of conduits are disposed within passage 42. The larger of the two conduits 43 is adapted to conduct a cooling fluid used in cooling the expander. The smaller conduit 44 serves to transport a lubricating fluid to be employed in lubricating the complementary die and expander surfaces and the radial and longitudinal keys.

The passage 42 communicates with an annular recess 45 formed in the rearward end of piston rod 4. The recess serves as a housing for suitable couplings for conduits 43 and 44, and the open end of recess 45 is closed off by the flanged closure plate 46. A plurality of circumferentially spaced bolts 47 are employed to secure the annular flange 48 of closure plate 46 to the rearward end of piston rod 4.

The cooling and lubricating conduits 43 and 44 extend outwardly through suitable apertures in plate 46 and upwardly around the rearward end of rod 4. The cooling conduit 43 is joined by a suitable fitting 49 to an oblique passage 50 formed in the rearward end of mandrel 9. Passage 50 extends inwardly from the end surface of the mandrel and communicates with spiral groove 40 at the inner surface of the mandrel adjacent piston rod 4.

The cooling fluid enters conduit 43 at the cylinder end of piston rod 4 and passes therethrough to spiral groove 40 in mandrel 9 by way of passage 50.

A substantial amount of the heat generated by the expansion operation is removed by the cooling fluid as it circulates within groove 40. The fluid, thus heated, passes from groove 40 to axial passage 42 in rod 4 via aperture 41, and it travels counter-currently to the entering fluids within conduits 43 and 44 which are disposed within passage 42.

The lubricating conduit 44 is joined by a suitable fitting 51 at the rearward end of the mandrel to a system of lubricating passages 52 wherein the lubricating medium is distributed to the various contacting surfaces of the expander and die assembly.

This invention provides a unique method of introducing the cooling and lubricating fluids to the expander unit, whereby the fluids enter and, in the case of the coolant, leave through the piston rod, there being no outside connection to the expander unit to interfere with the free movement of the mandrel and pipe.

Piston rod 4, on which mandrel 9 is mounted, is employed to draw the mandrel into die assembly 8 and is formed integrally with the piston 54. Piston 54, as shown in Fig. 10, is adapted to reciprocate within the cylinder 3 and may be actuated therein by any convenient means well known in the art, such as hydraulic pressure.

The length of the piston stroke, and hence the magnitude of expansion, is determined by the adjustable piston stop 55 which is threaded onto piston rod 4 and is adapted to strike the annular shoulder 56 of cylinder 3 and thus stop the forward movement of piston rod 4.

Piston stop 55 is locked in its desired position on rod 4 by set screw 57 which extends through a suitable opening in housing 24 and engages one of a series of circumferentially spaced grooves 58 in stop 55.

By threading the stop 55 away from the annular shoulder 56 of the cylinder 3 a maximum stroke is attained. Threading stop 55 toward piston 54, reduces the piston stroke and thereby correspondingly decreases the relative movement of mandrel 9 within die assembly 8, thus reducing the magnitude of expansion.

Axial passage 42 in the piston rod 4 extends through the integral piston 54 and receives a threaded pipe 59 at the outer extremity of the piston. Pipe 59 extends outwardly through a suitable opening in the forward end of cylinder 3 and receives a T-fitting 60. The stem portion 61 of fitting 60 serves as a coolant discharge conductor. The cooling and lubricating conduits 43 and 44, which extend unbrokenly within passage 42 and extension pipe 59, project through the arms 62 of fitting 60 and are connected to suitable sources of cooling and lubricating fluid, not shown.

The piston rod housing 24 which encircles piston rod 4 extends between expander unit 1 and cylinder 3. One end of the housing is secured to thrust plate 10 as previously described. The opposite or forward end of the housing is similarly secured to cylinder 3 by a plurality of circumferentially spaced bolts 63 which extend through the flange 64 of housing 24.

The lower portion of housing 24 is formed with a transverse slot 65 and generally rectangular block 66 is secured within said slot by a series of suitable bolts. The lower surface of the block 66, as shown in Figs. 10 and 21 and 22, projects beneath the curved surface of housing 24 and serves as a rest pad for housing support 67 which is disposed beneath housing 24 and serves to support the housing.

The housing support 67 comprises a base plate 68 on which is mounted a pair of spaced generally triangular side members 69 joined by an angular web 70.

A generally rectangular frame 71 is slidably disposed between the spaced side members 69 by a suitable tongue and groove unit 72. Frame 71 may be vertically adjusted to any desired height by inserting a suitable spacing block 73 between the bottom plate 74 of the frame 71 and base plate 68.

A pair of spaced bearing brackets 75 extend upwardly from the bottom plate 74 of frame 71 and pivotally support a shaft 76 therebetween.

A pair of spaced links 77 are secured to shaft 76 between brackets 75 and extend upwardly therefrom toward the piston rod housing 24. A shaft 78 is secured between the upper extremities of spaced links 77 and a support roller 79 is rotatably secured on shaft 78 between links 77.

Roller 79 extends a slight distance beyond the upper extremities of links 77 to bear against block 66 at the bottom of housing 24 and thereby supports the housing.

Links 77 are formed with ears 80 between which a downwardly extending piston rod 81 is pivotally attached.

The piston rod 81 is actuated in reciprocating movement by a solenoid-operated air cylinder 82 which is pivotally mounted in a suitable trunnion 83. Trunnion 83 is carried by a pair of spaced arms 84 which extend outwardy from frame 71.

An angle iron shoe 85 extends between the projections 86 of spaced links 77 and is adapted to rest on the upper surface of stop block 87 which is secured to the outer surface of side wall 88 of frame 71. Shoe 85, by contacting stop block 87, limits the upward pivotal rotation of links 77 and centers the supporting roller 79 beneath resting block 66.

The pipe to be expanded is disposed circumjacent to the expander unit and is moved forwardly over piston housing 24 toward cylinder 3 during the incremental expansion operation. When the pipe reaches a certain predetermined position during such movement a solenoid, or other electro-magnetic means not shown, is energized which actuates air cylinder 82 and draws the piston rod 81 downwardly therein, thereby pivoting links 77 about the pivotal shaft 76 and rotating the attached supporting roller 79 downwardly away from resting block 66.

After the series of expansion operations the circumjacently disposed pipe is retracted from the expander unit 1 and the solenoid is de-energized, releasing piston rod 81 from air cylinder 82. Rod 81 moves upwardly and rotates links 77 and attached roller 79 toward resting block 66 with the roller being positioned beneath the resting block by bracket stop block 87 and once again supporting the piston rod housing.

A roller 89 is rotatably secured within a recess 90 in the lower portion of the cylindrical piston rod housing 24 adjacent thrust plate 10. The roller 89 extends a slight distance beneath the generally curved surface of the housing and is spaced above, and vertically aligned with, a conveyor roller 5. The spacing is of a sufficient width to permit the forward edge of the pipe 2 to pass therebetween as it moves forwardly over the expander unit 1 during the incremental expansion.

As the pipe passes between housing roller 89 and the aligned conveyor roller 5 the solenoid is energized and, by the process described above, supporting roller 79 is rotated downwardly away from resting block 66 and conveyor roller 5 assumes the function of supporting the expander unit 1 and piston rod housing 24.

The supporting roller 79, in its downward position, is sufficiently spaced from housing 24 to permit pipe 2 to move forwardly around the housing toward cylinder 3 during the series of expansion operations without obstructing the pipe in its movement.

After the series of expansion operations, the pipe is retracted from the housing. The solenoid is deenergized as the forward edge of the pipe passes between the spaced rollers 89 and 5, and supporting roller 79 is rotated upwardly into contact with resting block 66 to once again support the housing and expander unit.

The series of conveyor rollers 5 are in alignment with expander unit 1 and serve to convey the pipe 2 to and from the unit.

The number of conveyor rollers 5 employed depends largely on the length and weight of the pipe to be expanded. As shown in Fig. 2 two of such rollers are disposed beneath housing 24, one of which cooperates with housing roller 89, two are disposed between expander unit 1 and lifter unit 7, three are disposed beneath lifter unit 7, and a final roller is placed at the rearward end of the assembly.

Each of the conveyor rollers 5, as best seen in Figs. 5 and 6, has a generally concave shape and is mounted on shaft 91 which is suitably journaled between a pair of bearing blocks 92. Bearing blocks 92 are slidably disposed between the side members 93 which are vertically mounted on the base plate 94. A suitable spacer block 95 may be disposed beneath the bearing blocks 92 to vertically adjust the height of rollers 5 and thereby align the longitudinal axis of the pipe resting on the rollers with that of expander unit 1.

Lifter unit 7 is adapted to receive the pipe 2 to be expanded from a suitable storage rack 96 and lower the same onto the series of conveyor rollers 5 on which it is conveyed to the expander unit 1. After expansion the pipe 2 is withdrawn from the expander unit over conveyor rollers 5 and lifter unit 7 raises the expanded pipe from the rollers and ejects it onto a second storage rack 96.

Lifter unit 7, as shown in Figs. 5 and 6, comprises a frame 97 which is generally rectangular in shape and includes a pair of horizontally disposed, laterally spaced channel members 98 and a pair of longitudinally spaced box stiffeners 99 which extend between channels 98 to provide a rigid unitary structure. Frame 97 is positioned above a number of the aligned conveyor rollers 5 and is adapted to be lowered therearound with the rollers projecting upwardly through the frame between stiffeners 99 when the frame is in its lowered position.

A pair of transverse roller units 100, as shown in Figs. 5 and 8, are mounted on the frame 97 adjacent the ends thereof. The supporting structure for each assembly 100 includes a base plate 101 which extends between the spaced channel members 98 of frame 97, and a pair of spaced transverse webs 102 which extend upwardly from the base plate 101 between the channel members 98.

A pair of transverse rollers 103 are each mounted for rotation between the upper portions of the spaced webs 102. A sprocket 104 is secured to the end of each of the roller shafts facing toward the center of the frame and serves to carry a continuous belt 105 which is actuated by a pair of air motors 106.

The air motors 106 are secured in a spaced relation between the webs 102 outwardly beneath the transverse rollers 103. A drive shaft 107 extends outwardly from each air motor and receives a sprocket 108 which lies in the same transverse plane as the roller sprockets 104.

A vertically adjustable tightening sprocket 109 may be disposed centrally of the motor sprockets 104 and roller sprockets 108 to maintain the proper tension on belt 105.

An extension plate 110 extends laterally outward from each roller shaft journal 111 a substantial distance beyond frame 97 and is supported by the upper edge of the channel member 98. The plate 110 serves as a guiding platform for the pipe 2 as it is rolled to and from the resting position on the frame.

The pipe 2 rests on the spaced rollers 103 at each end of frame 97 when the frame is in its elevated position. Rotary motion is transmitted to rollers 103 from the air motors 106 by the continuous belt 105, and the overlaying pipe 2 is thereby rotated so that the longitudinal weld seam is positioned upward in a location to be received by the die slot 14 as the pipe is moved forwardly onto the expander unit 1.

After expansion the pipe is withdrawn from the expander unit and once again is supported by the frame 97. Pipe 2 rests on transverse rollers 103 which give rotary motion to the pipe and, as the pipe rotates, a pair of transfer units 112 which are longitudinally spaced within the frame and mounted adjacent the transverse rollers are pivoted upwardly into contact with the rotating pipe and eject the same from frame 97.

Each transfer unit 112, as shown in Figs. 9 and 20, includes a cross plate 113 having a plurality of downwardly extending webs 114 which is disposed between the upper edges of spaced channel members 98 of frame 97. A transfer roller 115 is mounted for rotation between a pair of spaced transversely disposed bell crank levers 116 and projects partially upward through an opening 117 in cross plate 113 to a position slightly below and to the side of pipe 2 as the pipe rests on frame 97.

The bell crank levers 116 are pivotally actuated about a shaft 118, extending between the spaced webs 114, by a hydraulic cylinder 119 which is trunnioned between the reinforcing webs 114 beneath the cross plate 113 adjacent the transfor rollers 115.

The reciprocating motion of the cylinder 119 is transmitted through a piston rod 120 and arm 121 to the torque shaft 122 which is rotatably secured by brackets 123 to the outer surface of channel 98. Torque shaft 122 serves to connect the transfer units 112 which are spaced at the ends of frame 97 and to coordinate their movements.

The rotation of the torque shaft 122 by cylinder 119 pivotally actuates the bell crank levers 116 through the link 124 and arm 125 to move the transfer rollers 115 upwardly against the pipe and laterally displace the same from its resting position on the transverse rollers 103 onto a suitable storage rack 96 adjacent frame 97.

The channel member 98 adjacent torque shaft 122 is formed with a suitable opening 126 through which the links 120 and 124 and arms 121, and 125 are adapted to move as the transfer roller 115 is actuated upwardly.

A suitable linkage unit 127, as shown in Figs. 5, 6 and 7, is employed at either end of frame 97 to lower and elevate the same. Each linkage unit 127 comprises a pair of bearing brackets 128 which are secured by suitable bolts to the inner surface of the web of the respective channels 98 at the ends of frame 97. The brackets 128 extend outwardly from frame 97 and a transverse shaft 129 is pivotally secured between the outer ends of brackets 128.

Transverse shaft 129 extends the width of frame 97 and a sleeve 130 is secured to the mid-portion of shaft 129 between bearing brackets 128. Sleeve 130 is provided with a pair of spaced downwardly extending links 131 which are attached to pivot shaft 132.

Pivot shaft 132 is disposed beneath, and in a parallel relation to, shaft 129 and is suitably journaled between the spaced brackets 133.

Brackets 133 at the forward end of frame 97 are disposed laterally inward and below bearing brackets 128. The brackets 133 at the rearward end of frame 97 are vertically aligned with bearing brackets 128 to permit each of links 131 to be aligned with one of a pair of air cylinders 134 which are disposed side by side adjacent the rearward end of frame 97.

The brackets 133 are mounted on a suitable base plate 135 and a cross plate 136 extends upwardly from base plate 135 between brackets 133 to give added support thereto.

One of the links 131 which connect sleeve 130 with pivot shaft 129 extends upwardly and is secured to the link shaft 137 through the sleeve 138. The link shaft 137 is disposed above shaft 129 and extends laterally a slight distance beyond side channel 98 of frame 97. The outer end of link shaft 137 is pivotally secured to connecting rod 139 which extends longitudinally the length of frame 97 and joins the respective link shafts 137 at each end of the frame to transmit the movement of one linkage unit 127 to the other.

Each of the link brackets 131 at the rearward end of frame 97 is formed with an outwardly extending projection which is pivotally secured to the forked end of a piston rod extension bracket 140. The other end of extension bracket is threadedly engaged by piston rod 141 which is adapted to be reciprocatingly actuated by the air cylinder 134. The cylinders 134 are disposed in a side-by-side relation adjacent the rearward end of the lifter unit 7 and are cradled in the trunnions 142 which is carried between the outward extensions of the brackets 133.

To lower frame 97, piston rods 141 are outwardly actuated by air cylinders 134 thereby pivoting linkage units 127 and the attached frame 97 forwardly and downwardly about pivot shaft 132. Frame 97 is thus lowered around conveyor rollers 5 with the rollers projecting upwardly between side channels 98 of the frame when the frame is in its lowered position. A reciprocal motion of the piston rod will correspondingly elevate the frame through linkage unit 127 above the level of the rollers.

A feeder unit 6 is employed to move the pipe longitudinally over conveyor rollers 5 to and from the expander unit 1. Feeder unit 6 comprises a clamping jaw mechanism 143 which is mounted on a movable carriage 144 and serves to grasp the open end of the pipe, and a rail unit 145 disposed parallelly adjacent to expander unit 1, over which carriage 144 is adapted to roll.

Clamping jaw mechanism 143, as shown in Figs. 15, 16 and 17, spaced guide blocks 146 which are secured to the upper surface of carriage 144 and project laterally outward therefrom toward the adjacent expander unit 1. Each of guide ways 146 is formed with a step 147, which extends the entire length of the blocks.

Frame 148 is slidably disposed between guide ways 146 with base plate 149 of the frame having opposite edge portions shaped to complement the respective steps 147 and being adapted to slide laterally therein. A pair of keeper plates 150 are secured by a series of bolts 151 to the upper surfaces of the respective guide ways 146 to retain plate 149 within grooves 147. The clamping jaw arms 152 which are attached to frame 148 in a manner hereinafter set forth, may thereby be moved laterally to be aligned with the pipe edge as the pipe rests upon the conveyor rollers 5.

In addition to base plate 149, frame 148 includes side plates 153 which extend upward from base plate 149 and a horizontally disposed top plate 154 which is secured to the top edges of side plates 153.

A shaft 155 extends vertically between base plate 149 and the corner portion of top plate 154 and clamping jaw arms 152 are pivotally secured to shaft 155 with the beveled feeder jaws 156 of each clamping jaw arm being adapted to converge and firmly grasp the rearward edge of the pipe as the jaw arms are moved outwardly away from each other by toggle links 157.

The outer extremities of each jaw 152 are pivotally attached to one of the pair of toggle links 157. The inner portion of each link 157 is pivotally secured to the pin 158.

A roller 159 is mounted for rotation on the lower end of pin 158 and is adapted to roll within a generally rectangular slot 160 in base plate 149 as toggle links 157 are pivotally actuated during operation.

Spring rod fork 161 is secured to pin 158 outwardly adjacent of toggle links 157. Spring rod 162 attached to the fork 161 extends laterally outward therefrom through a suitable opening in one of the side plates 153 to a position beyond frame 148.

A spring 163 encircles spring rod 162 and is employed to maintain toggle links 157 in an extended position and thereby close the jaws 152. The amount of spring tension may be varied by any suitable adjustment means such as a tension plate 164.

One of the pairs of toggle links 157 is formed with a projection or ear adjacent the inner end thereof and a roller 165 is rotatably secured to the ear. A complementary fixed roller 166 is rotatably secured between base plate 149 and a bracket 167 mounted on the base and spring 163 by maintaining links 157 in an extended position serves to urge roller 165 toward fixed roller 166.

Roller 165 is adapted to be moved laterally from adjacent roller 166 by a stationary cam bar 168 as the carriage 144 and attached clamping jaw mechanism 143 approach the rearward limit of their longitudinal movement. By separating the rollers 65 and 66 the cam bracket actuates toggle links 157 to open clamping jaws 152.

Cam bar 168 is independently mounted on a support 169 which is disposed adjacent the rearward end of rail unit 145 and comprises a tubular, reinforced frame 170 mounted on a suitable base plate 171.

A generally semi-circular plate 172 is secured to the top of tubular frame 170 with the straight edge portion thereof extending forwardly toward the rail unit 145 and abutting against a vertically disposed rectangular guide plate 173.

A grooved guide block 174 receives guide plate 173 and block 174 is adapted to slide laterally on plate 173 to provide cam bar 168 which is attached to block 174 with a lateral adjustment corresponding to that of clamping jaw mechanism 143. A pair of keeper plates 175 are secured by bolts 176 to guide blocks 174 to maintain guide plate 173 therein.

A pair of spaced lugs 177 extend forwardly from guide block 174 toward carriage 144 and a vertically disposed pin 178 is pivotally secured therebetween. The base portion of cam bar 168 flares outwardly to provide a base lever 179 with the central portion of lever 179 being pivotally mounted on the pin 178 between spaced lugs 177. A pair of adjusting screws 180 extend through suitable threaded openings in the extremities of lever 179 to bear against the forward surface of guide block 174 and provide an accurate means for laterally adjusting the tip of the cam bar.

Cam bar 168 may preferably be adjustable in length so that the adjacent rollers 165 and 166 may contact the tip of the cam bar and be separated at any predetermined position and hence open the jaws 152 and release the pipe at that point.

It is desirable to position the tip of cam bar 168 so that the jaws 152 will open a short distance before the carriage 144 reaches its rearward extended position, in order that the pipe edge will be free from the opened jaws when the extended position is reached.

Carriage 144, as shown in Figs. 3, 4, 15, 18 and 19, on which clamping jaw mechanism 143 is mounted includes a generally rectangular frame 181 which is formed of a pair of spaced channel-shaped side members 182 and a top plate 183 which extends between the upper portion of side members 182.

A plurality of spaced transverse channels 184 extends between side members 182 beneath plate 183 to reinforce frame 181, and a plurality of spaced transverse guide bars 185 is secured to the upper surface of top plate 183. The pipe is adapted to roll on guide bars 185 as it is moved from a storage rack 96 to the lifter unit 7.

A plurality of transverse roller shafts 186 is spaced within frame 181 and mounted for rotation in suitable roller bearing units 187.

The bearing units 187 are secured to the inner surface of frame 181 and access can be had to the units through the openings 188 in side members 182.

The carriage 144 is adapted to roll on the horizontally disposed rail 189 of rail unit 145. A pair of spaced rollers 190 is secured to each shaft 186 and rides on the upper surface of rail 189. A pair of rollers 191 which is aligned beneath rollers 190 rolls against the lower surface of the rail.

Lower rollers 191 are each mounted on a stud 192 secured in a bracket 193 which is secured to the underside of roller bearing unit 187.

A pair of horizontally disposed rollers 194 are adapted to ride against the respective longitudinal side edges of rail 189 and are disposed within carriage frame 181 adjacent the ends of the frame. Rollers 194 are each secured to the lower end of a vertically disposed stud 195 which is secured in bracket 196. The brackets 196 are attached to the respective side members 182 of carriage frame 181 by a pair of spacer blocks 197 which space rollers 194 from side members 182 and permit free rotation of the rollers.

The rail unit 145 comprises the generally rectangular, horizontally disposed rail 189 which is supported by a pair of spaced side plates 198. Side plates 198 extend upwardly from base plate 199, and a pair of hydraulic cylinders 200 are attached to the outer surface of the respective side plates 198 and serve to actuate carriage 144 on rail unit 145.

The longitudinal side edges of the generally rectangular rail 189 extend outwardly beyond side plates 198 and abut against horizontal rollers 194. As the carriage is moved over the rail by cylinders 200, horizontal rollers 194 roll against the side edges of the rail, upper rollers 190 ride on the upper surface of the rail, and lower rollers 191 roll against the lower surface thereof.

The hydraulic cylinders 200 face oppositely and are attached to the outer surface of the respective side plates 198 beneath the longitudinal side edges of rail 189 by a plurality of spaced collars 201 which partially encircle the cylinders and are bolted to side plates 198. The working end of each of the piston rods 202 which extend outwardly from the respective cylinders 200 is secured to opposite ends of carriage 144 and each of the rods 202 is employed to move carriage 144 in opposite directions over rail unit 145.

The working end of each piston rod 202, Fig. 19, extends through a connecting block 203 and is removably secured therein by nuts 204 which engage the threaded, projecting end of the rod. The blocks 203 in turn are joined between the lower extremities of a pair of U-shaped cross plates 205 which are secured edgewise to the inner surface of carriage frame 181 to provide a firm attachment between piston rod 202 and carriage 144.

To operate the pipe expander assembly, carriage 144 is moved over rail unit 145 to its extended position wherein the attached clamping jaw mechanism 143 is disposed rearward of the end of lifter unit 7. With carriage 144 in its rearward extended position cam bar 168 is disposed between the toggle-actuating rollers 165 and 166 and the clamping jaws 152 are open.

The pipe 2 to be expanded rests on a suitable storage rack, not shown, adjacent and parallel to the extended carriage 144. Pipe 2 is then rolled laterally by any convenient means, over guide bars 185 on the upper surface of carriage 144 and is deposited on the elevated frame 97 of the first of two parallel lifting units 7.

Frame 97 of the lifter unit, being in an elevated position, extends upwardly above conveyor rollers 5 and the pipe rests thereon between the pair of transverse roller units 100 disposed at each end of the frame.

The pipe is rotated by transverse rollers 103, which are actuated by air motors 106 acting through belt 105 to position the pipe so that the longitudinal weld seam of the pipe faces upward.

Frame 97 is then lowered, by cylinders 134 acting through linkages 127, over the aligned conveyor rollers 5 so that the rollers project upwardly through the lowered frame and support the pipe.

Carriage 144 is then moved forwardly away from its extended position over rail 189 by hydraulic cylinders 200 with the attached clamping jaw mechanism 143 moving toward the open rearward end of pipe 2 which rests on the conveyor rollers 5.

The open clamping jaws 152 tend to close as toggle-actuating rollers 165 and 166 of mechanism 143 move toward the tip of cam bar 168. The tip of bracket 168 is longitudinally positioned so that the jaws will be firmly closed when the edge of the pipe is disposed therebetween.

The firmly held pipe 2 travels over the aligned conveyor rollers 5 toward expander unit 1 as the carriage 144 and attached clamping jaws 152 are moved forwardly over the rail unit 145.

A substantial section, approximately three feet, of the pipe is received by the expander unit 1 and is disposed circumjacently to the collapsed dies 11 of die assembly 8. The tapered expander or mandrel 9 is drawn into the die assembly 8 by hydraulic cylinder 3 and the circumferentially disposed dies 11 are expanded outwardly against the pipe.

The magnitude of expansion is determined by the adjustable piston stop 55, for the greater the piston stroke, the greater the diametric expansion of the pipe.

After the pipe section has been properly expanded to the predetermined size, the mandrel 9 is withdrawn from the die assembly 8, thereby collapsing the dies 11.

The pipe which is firmly grasped by clamping jaws 152 throughout the process is moved further onto the expander unit 1 by feeder unit 6. A small amount of overlap is permitted as the pipe is moved forward on the expander unit to provide a uniformly expanded pipe length.

As the pipe is moved forward after the initial expansion increment, the leading edge thereof passes between housing roller 89 and aligned conveyor roller 5 thereby energizing a solenoid which actuates cylinder 82 and pivots supporting roller 79 downwardly away from housing 24. The expander unit 1 and the housing at its free end are then supported solely by the conveyor roller 5.

After a series of expansion increments which cover slightly more than one-half of the pipe, the leading or forward edge of the pipe is in a proximate relation with cylinder 3. The pipe is then withdrawn from the expander unit by the feeder unit 6.

As carriage 144 moves rearwardly over rail unit 145 and approaches its extended position, toggle-actuating rollers 165 and 166 are separated by cam bar 168 thereby opening the clamping jaws 152 and releasing the pipe. Carriage 144 and the attached jaws 152 continue a slight distance rearwardly beyond the point of pipe release to free the pipe edge from the opened clamping jaws and allow the pipe to be moved laterally without being obstructed in such movement by the jaws.

Frame 97 is then elevated and the pipe 2 is once again supported on the frame, resting on transverse rollers 103. Rotary motion is given to the pipe by the transverse rollers 103 and transfer rollers 115 are actuated upwardly against the rotating pipe by cylinders 119 acting through linkage 116 to eject the pipe from frame 97 in the direction of pipe rotation. The ejected pipe is received by the transfer frame 96, over which the pipe rolls as it is transferred to the second lifter unit 7.

By a series of similar operations proceeding from the unexpanded end of the pipe, the pipe is expanded by the second expander unit over its entire length to the predetermined cross-section.

The present invention, without adjustment or interchanging of parts, may be employed to expand pipe with diameter variances up to one-half inch. However, by a few adjustments the expander can be utilized to expand pipe of substantially different sizes. The dies in the die assembly and the mandrel are both adapted to be readily interchanged for use with different sized pipe. The conveyor rollers may be adjusted in height so that the pipe will be centered with the expander unit. Similarly the clamping jaw and actuating cam bracket are laterally adjustable to align the jaws with the pipe edge. Thus by a few rather simple adjustments the assembly can be employed to expand pipes of substantially different sizes.

Various embodiments of the invention may be employed within the scope of the accompanying claims.

We claim:

1. An expanding device for expanding large diameter pipe in cross section comprising a fixed thrust plate formed with an axial opening therein, a hollow expandable die assembly to be disposed within the pipe and formed of a plurality of circumferentially spaced dies and having one end of said assembly in contact with the thrust plate, a reciprocating rod extending through the opening in said thrust plate and within said hollow die assembly, said rod being formed with an axial opening and a transverse opening communicating with said axial opening, a tubular mandrel mounted on said rod and to be received by said die assembly and expand the same radially outward against the pipe, said mandrel being formed with a generally longitudinal passage communicating with the transverse opening in said rod, and an inlet conduit disposed within the axial opening in said rod and connected to the passage in said mandrel to convey a cooling medium to said passage, said cooling medium being returned from said passage through the transverse opening to the axial opening in said rod surrounding said conduit for discharge from the system.

2. An expanding device for expanding large diameter pipe in cross section comprising a fixed thrust plate formed with an axial opening therein, a hollow expandable die assembly to be disposed within the pipe and formed of a plurality of circumferentially spaced dies and having the forward end of said assembly keyed to said thrust plate, a reciprocating rod extending through the opening in said thrust plate and within said hollow die assembly, said rod being formed with an axial opening and a transverse opening communicating with said axial opening, a tubular mandrel mounted on said rod and adapted to be received by the rearward end of said die assembly and expand the same radially outward against the pipe, said mandrel being formed with a generally spiral groove in the inner surface thereof adjacent said rod with an end of said groove communicating with the transverse opening in said rod, and an inlet conduit to convey a cooling medium to the spiral groove, said conduit being disposed within said axial opening in the rod and extending outwardly beyond the rearward end of said rod and connecting to the other end of said spiral groove, said cooling medium being returned from said groove through the transverse opening to the axial opening in said rod for discharge from the system.

3. An expanding device for expanding relatively large diameter pipe in cross section to improve the mechanical properties thereof comprising, a fixed expander unit having a hollow annular die assembly to circumjacently receive the pipe, a tapered mandrel adapted to be received within the hollow assembly and expand said assembly radially outward against said pipe, supporting means to support the expanding unit before the pipe is received by said expander unit, feeder means to feed the pipe to be expanded onto the expander unit, and means to withdraw the supporting means from said expander unit as the pipe is moved onto the expander unit with said feeder means then supporting said unit.

4. An expanding device for expanding relatively large diameter pipe in cross section to improve the mechanical properties thereof comprising, a fixed expander unit having a hollow annular die assembly to circumjacently receive the pipe and a tapered mandrel to be received within the hollow die assembly and expand said assembly radially outward against the pipe, supporting means to support said expander unit before the pipe is received by said unit, a plurality of conveyor rollers aligned with the expander unit with at least one of said rollers disposed beneath said unit and spaced from said unit a sufficient distance to permit the forward edge of the pipe to pass between the roller and the unit as the pipe is moved onto said unit, feeder means to move the pipe to be expanded over said rollers onto said expander unit and to remove the expanded pipe from said unit, and means to withdraw the supporting means from said expander unit as the forward edge of the unexpanded pipe passes between said unit and said roller with said conveyor rollers then supporting said unit and to replace said supporting means into contact with said unit to support the same as the forward edge of the expanded pipe passes rearwardly between said unit and said roller with said conveyor rollers then being spaced from said expander unit.

5. An expanding device for expanding relatively large diameter pipe in cross section to improve the mechanical properties thereof comprising, a fixed expander unit to circumjacently receive the pipe and expand the same radially outward, supporting means disposed beneath the expander unit to support said unit before the pipe is received by said unit, conveyor means aligned with said expander unit with a portion of said conveyor means being disposed beneath said unit and spaced from said unit a sufficient distance to permit the forward edge of the pipe to pass between said roller and said unit as said pipe moves forwardly onto said unit, feeder means to move the pipe to be expanded forwardly over said conveyor means unit into a circumjacent relation with said expander unit, and means to withdraw the supporting means from said unit as the pipe passes forwardly between the expander unit and the conveyor means with said conveyor means then supporting said unit.

6. An expanding device for expanding relatively large diameter pipe in cross section to improve the mechanical properties thereof comprising, an expander unit to circumjacently receive the pipe to be expanded, said expander unit having a hollow annular die assembly and a tapered mandrel to be received by the hollow die assembly and expand said assembly radially outward against the circumjacent pipe, conveyor means aligned with the expander unit to carry the pipe toward and away from said unit, movable clamping means to grasp the edge of the pipe and move the unexpanded pipe forwardly over the conveyor means onto the die assembly and withdraw the expanded pipe rearwardly over said conveyor means from said assembly, and means to open the clamping means and release said pipe edge when said clamping means reaches a predetermined position in its rearward travel and to close said clamping means and grasp the pipe edge when said clamping means reaches said predetermined position in its forward travel.

7. An expanding device for expanding relatively large diameter pipe in cross section to improve the mechanical properties thereof comprising, an expander unit to circumjacently receive the pipe to be expanded, said expander unit having a hollow annular die assembly and a tapered mandrel to be received by the hollow die assembly and expand said assembly radially outward against the circumjacently disposed pipe, a plurality of spaced conveyor rollers aligned with the expander unit over which the pipe is moved toward and away from said expander unit, a rail unit disposed laterally adjacent the conveyor rollers, a carriage riding on said rail unit, reciprocating means attached to the carriage to move said carriage over said rail unit, clamping means mounted on said carriage to grasp the edge of the pipe and move said pipe longitudinally over said rollers as said carriage moves on said rail unit, and means disposed adjacent an end of said rail unit and adapted to be engaged by the carriage and actuate said clamping means when said carriage reaches a predetermined position on said rail unit.

8. An expanding device for expanding relatively large diameter pipe in cross section to improve the mechanical properties thereof comprising, an expander unit to be disposed within the pipe, said expander unit having a hollow annular die assembly and a tapered mandrel to be received by the hollow die assembly and expand said assembly radially outward against the pipe, a plurality of spaced conveyor means aligned with the expander unit over which the pipe is moved toward and away from said expander unit, a rail disposed adjacent the conveyor means, a carriage riding on said rail, and clamping means mounted on said carriage to grasp the edge of the pipe and move said pipe longitudinally over said conveyor means as said carriage moves on said rail.

9. An assembly for expanding relatively large diameter pipe in cross section to improve the mechanical properties thereof comprising, an expander unit circumjacently receiving the pipe to be expanded, said expander unit having a hollow annular die assembly and a tapered mandrel adapted to be received by the hollow die assembly and expand said assembly radially outward against the circumjacent pipe, a plurality of conveyor rollers aligned with the expander unit to carry the pipe toward and away from said expander unit, feeder means to move said pipe longitudinally over said rollers and serving to feed and withdraw said pipe from said expander unit, and a lifter frame aligned with said expander unit and disposed above a number of the conveyor rollers to initially receive said pipe to be expanded, said frame being adapted to be lowered about the underlaying rollers and deposit said pipe on said rollers with said rollers projecting upwardly through said frame.

10. An assembly for expanding relatively large diameter pipe in cross section to improve the mechanical properties thereof comprising, an expander unit to circumjacently receive the pipe to be expanded, said expander unit having a hollow annular die assembly and a tapered mandrel to be received by the hollow die assembly and expand said assembly radially outward against the circumjacently disposed pipe, a plurality of spaced conveyor rollers aligned with the expander unit to carry the pipe toward and away from said expander unit, feeder means to move said pipe longitudinally over said rollers and serving to feed the unexpanded pipe onto the expander unit and withdraw the expanded pipe from said unit, a lifter frame aligned with said expander unit and disposed above a number of the conveyor rollers to initially receive said pipe to be expanded, said frame being adapted to be lowered about the underlaying rollers and deposit the unexpanded pipe on said rollers with said rollers projecting upwardly through said frame and said frame also being adapted to be raised above said rollers and lift the expanded pipe from said rollers after said pipe is withdrawn from the expander unit, and means to eject the expanded pipe from said lifter frame.

11. An assembly for expanding relatively large diameter pipe in cross section to improve the mechanical properties thereof comprising, an expander unit around which the pipe to be expanded is adapted to be circumjacently disposed, said expander unit having a hollow annular die assembly and a tapered mandrel to be received by the hollow die assembly and expand said assembly radially outward against the circumjacently disposed pipe, a plurality of spaced conveyor rollers aligned with the expander unit over which the pipe is moved toward and away from said expander unit, feeder means to move said pipe longitudinally over said rollers and serving to feed and withdraw said pipe from said expander unit, a lifter frame aligned with said expander unit and disposed above a number of the conveyor rollers to initially receive said pipe to be expanded, said frame being adapted to be lowered about the underlaying rollers and deposit the unexpanded pipe on said rollers with said rollers projecting upwardly through said frame and said frame also being adapted to be raised above said rollers and lift the expanded pipe from said rollers after said pipe is withdrawn from the expander unit, means mounted on said frame to give rotary motion to the expanded pipe while said pipe is supported on said frame, and ejection means mounted on said frame to eject the rotating pipe from said frame in the direction of rotation.

12. An assembly for expanding relatively large diameter pipe in cross section to improve the mechanical properties thereof comprising, a fixed expander unit to circumjacently receive the pipe to be expanded, said expander unit having a hollow annular die assembly and a tapered mandrel to be received by the hollow die assembly and expand said assembly radially outward against the circumjacently disposed pipe, a plurality of spaced conveyor rollers aligned with the expander unit over which the pipe is moved toward and away from said expander unit, a rail disposed adjacent the conveyor rollers, a carriage riding on said rail, clamping means mounted on said carriage to grasp the edge of the pipe and move said pipe longitudinally over said conveyor rollers as said carriage moves on said rail, a lifter frame aligned with said expander unit and disposed above a number of the conveyor rollers to initially receive said pipe to be expanded, said frame being adapted to be lowered about said underlaying rollers and deposit the unexpanded pipe on said rollers with said rollers projecting upwardly through said frame, and said frame also being adapted to be raised above said rollers and lift the expanded pipe from said rollers after said pipe is withdrawn from the expander unit, roller means to give rotary motion to the expanded pipe, said pipe, resting on said roller means while said pipe is supported by said elevated frame, and an ejection roller mounted on said frame to be moved upwardly into contact with the rotating pipe and eject said pipe from said frame in the direction of rotation.

13. An assembly for expanding relatively large diameter pipe in cross section to improve the mechanical properties thereof comprising, a pair of fixed annular expanding units disposed in parallel relation, with the first unit of said pair of expander units circumjacently receiving one end of the pipe to be expanded and expanding in increments at least one-half of the length of said pipe and with the second expander unit subsequently receiving the unexpanded end of the pipe and expanding the unexpanded portion of said pipe to provide a fully expanded pipe section, conveyor means for each expander unit to carry the pipe longitudinally toward and away from the respective expander units, feeder means for each conveyor means to grasp the pipe and move said pipe over the respective conveyor means onto the respective expander unit and to withdraw the pipe after expansion from said expander unit over said conveyor unit, and means to transfer the partially expanded pipe from the first of the pair of conveyor means cooperating with the first expander unit to the second conveyor means.

References Cited in the file of this patent

UNITED STATES PATENTS

| | | |
|---|---|---|
| 183,241 | Work | Oct. 10, 1876 |
| 410,630 | Ashworth | Sept. 10, 1889 |
| 601,689 | Wallis | Apr. 5, 1898 |
| 872,168 | Clark | Nov. 26, 1907 |
| 1,022,720 | Buckley | Apr. 9, 1912 |
| 1,084,042 | Sessions | Jan. 13, 1914 |
| 1,166,040 | Burglingham | Dec. 28, 1915 |
| 1,193,078 | Scott | Aug. 1, 1916 |
| 1,458,605 | Woodward | June 12, 1923 |
| 1,469,565 | Manck | Oct. 2, 1923 |
| 1,504,764 | Johnson | Aug. 12, 1924 |
| 1,549,868 | Grotnes | Aug. 18, 1925 |
| 1,623,657 | Brown | Apr. 5, 1927 |
| 1,719,720 | Olsen | July 2, 1929 |
| 1,813,096 | Stenner | July 7, 1931 |
| 2,325,508 | Haas et al. | July 27, 1943 |
| 2,350,410 | Murphy | June 6, 1944 |

FOREIGN PATENTS

| | | |
|---|---|---|
| 610,115 | Germany | Mar. 2, 1935 |
| 803,247 | France | June 29, 1936 |